Patented Nov. 7, 1950

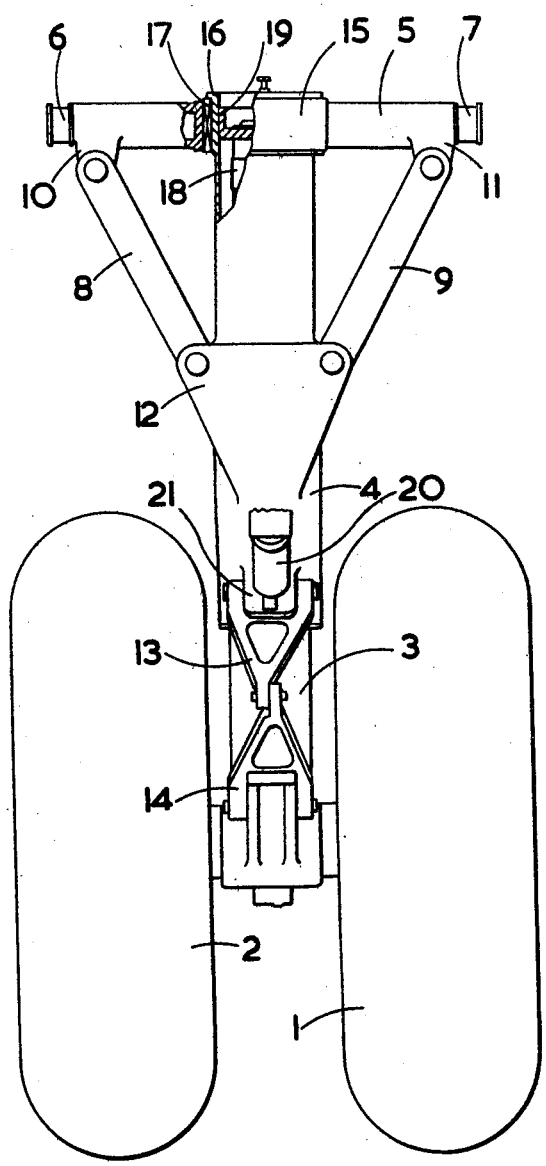

2,529,377

UNITED STATES PATENT OFFICE 2,529,377

UNDERCARRIAGE SUSPENSION FOR AIRCRAFT

Henry Davies, Stockton Heath, England, assignor to Electro-Hydraulics Limited, Warrington, Lancashire, England, a company of Great Britain Application November 8, 1948, Serial No. 58,955
In Great Britain December 3, 1947

5 Claims. (Cl. 244—103)

1

This invention relates to undercarriage suspension for aircraft. The term undercarriage as used herein is intended to include main legs, and tail and nose wheels. This invention deals with the type of undercarriage suspension in which the resilient telescopic unit is at its upper part connected to the aircraft at two points. It is known to connect the two attachment points by a structural member and to suspend the resilient telescopic unit from this structural member.

One of the difficulties encountered in the construction of such members is that they have to withstand considerable vertical loads, thus necessitating a substantial size and adding weight to the aircraft. The vertical loads also tend to deflect the structural member with the resulting adverse effects on the bearings of the attachment points.

It is an object of this invention to provide an undercarriage suspension whereby the structural member is mainly relieved of vertical bending and shear loads, thus allowing for its lighter and cheaper construction.

In an undercarriage suspension of the type described according to the present invention the resilient telescopic unit is slidably mounted within the structural member so as to be capable of vertical movement with respect thereto, the said unit being in pivotal connection with the structural member through tie members which take up wholly the vertical loads of the undercarriage.

One form of construction of undercarriage suspension is illustrated in the accompanying drawing which shows the arrangement in end elevation partly in section. In the drawing, the undercarriage suspension comprises a sliding tube 3 carrying wheels 1, 2, said tube 3 sliding in an outer tube 4 which in turn is arranged to slide in the bore of the structural cross member 5 which is connected through bearings 6, 7, at its ends for pivotal attachment to the aircraft. Two tie members such as for example as stays 8, 9, are pivotally connected between the structural member and the outer sliding tube for which purpose the structural member 5 which is conveniently in the form of a bored cross bar is provided with depending lugs 10, 11 one adjacent each end, that is to say near the point of attachment to the aircraft, whilst the outer tube 4 carries an arm 12, the stays being pivotally connected to the lugs and arm. The said tie members or stays 8, 9, as will become apparent below, are constructed so as wholly to take up the vertical loads of the undercarriage. If the load should be large enough, as it sometimes will be, to cause deflec-

2 tion of the members 8 and 9, the outer tube 4 would tend to move vertically with respect to the cross member 5. If the tube 4 were fixed to the cross member 5, this tendency would impose a bending load on the cross member midway of its end bearings 6 and 7. In accordance with the invention, the tube 4 can move vertically with respect to central part 15 of the cross member 5, so that such a bending load is not imposed on the member 5. The inner tube 3 which slides in the outer tube 4 is attached to said outer tube by torque links 13, 14.

The central portion 15 of the cross bar 5 is hollow to provide a bearing part to allow for vertical movement of the upper part 16 of the sliding tube 4 therein and the upper part 16 is coupled to the cross bar 5 by means of keys 17 engaging in keyways in the cross bar.

The inner sliding tube 3 carries the lower end of a shock absorber 18 which at its upper end is mounted on a cup member 19 fast with the upper end 16 of the outer tube 4.

A fore and aft stay 20 may be provided attached pivotally at one end to a lug 21 on the outer tube and at its other end to a portion of the aircraft.

The suspension works in the following way:

During landing operations any vertical loads taken up by the wheels 1, 2 will be transmitted to the inner sliding tube 3 and thence to the shock absorber 18 and cup member 19 onto the upper part 16 of the outer tube 4. As this tube is capable of sliding in the cross bar 5 the vertical loads will be transmitted wholly through the outer tube 4 to the arm 12 thereon and thence to the stays 8, 9, pivoted to the lugs 10, 11 of the cross bar. Reactions normally to the outer tube 4 whether fore or aft reactions or lateral reactions are transmitted by the direct contact of the outer tube 4 and the part 15 of the cross bar 5 to the bearings 6, 7 of either end by direct end loads in the cross bar or by the fore and aft bending of the cross bar. Torque loads in the outer tube 4 are transmitted from the keys and keyways 17 and the fore and aft bending of the cross bar to the outer bearings 6, 7.

What I claim is:

1. In an aircraft undercarriage suspension, a cross member having spaced bearings for mounting said cross member on an aircraft and a bearing part between said spaced bearings; a resilient telescopic unit having a part mounted in said bearing part for sliding movement relative to said cross member; and tie members pivotally connected respectively to said unit and to said cross member at points spaced from said bearing part, whereby the undercarriage vertical load is transmitted from said unit to said cross member wholly through said tie members.

2. Aircraft undercarriage suspension construction as set forth in claim 1 in which the spaced bearings are formed for mounting said cross member pivotally on an aircraft, and in which said tie members are pivotally connected to said cross member respectively at points near said spaced bearings and remote from said bearing part.

3. Aircraft undercarriage construction as set forth in claim 2 including means for restraining said unit against turning movement in said bearing part.

4. Aircraft undercarriage construction as set forth in claim 1 in which the part of said telescopic unit mounted in said bearing part is an outer tube, another part of said telescopic unit comprising a tube mounted to slide within said outer tube.

5. Aircraft undercarriage construction as set forth in claim 4 in which said tie members are connected at their lower ends to said outer tube, and in which said cross member is formed with depending lugs respectively adjacent said spaced bearings and to which the upper ends of said tie members are pivoted.

HENRY DAVIES.

REFERENCES CITED

The following references are of record in the file of this patent:

UNITED STATES PATENTS

| Number | Name | Date |
|---|---|---|
| 1,852,099 | Arcier | Apr. 5, 1932 |
| 2,351,215 | Kleinhans et al. | June 13, 1944 |
| 2,418,325 | Wassall et al. | Apr. 1, 1947 |
| 2,440,068 | Beringer | Apr. 20, 1948 |
| 2,474,630 | Jamison | June 28, 1949 |

FOREIGN PATENTS

| Number | Country | Date |
|---|---|---|
| 510,290 | Great Britain | July 31, 1939 |
| 527,191 | Great Britain | Oct. 3, 1940 |